US010503013B2

United States Patent
Okuyama

(10) Patent No.: US 10,503,013 B2
(45) Date of Patent: Dec. 10, 2019

(54) DISPLAY DEVICE INCLUDING AN OPTICAL MODULATOR

(71) Applicant: Japan Display Inc., Minato-ku (JP)

(72) Inventor: Kentaro Okuyama, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 16/385,310

(22) Filed: Apr. 16, 2019

(65) Prior Publication Data

US 2019/0243189 A1    Aug. 8, 2019

Related U.S. Application Data

(63) Continuation of application No. 15/958,799, filed on Apr. 20, 2018, now Pat. No. 10,303,000, which is a (Continued)

(30) Foreign Application Priority Data

Dec. 7, 2015    (JP) .................................. 2015-238496

(51) Int. Cl.
*G02F 1/1335*        (2006.01)
*G02F 1/1337*        (2006.01)
(Continued)

(52) U.S. Cl.
CPC ........ *G02F 1/133615* (2013.01); *G02F 1/137* (2013.01); *G02F 1/1334* (2013.01); (Continued)

(58) Field of Classification Search
CPC ......... G02F 1/133615; G02F 1/133553; G02F 1/134309; G02F 1/137; G02F 1/1337; (Continued)

(56) References Cited

U.S. PATENT DOCUMENTS 5,731,861 A     3/1998  Hatano
6,340,999 B1    1/2002  Masuda et al.
(Continued)

FOREIGN PATENT DOCUMENTS

JP     07-199184 A    8/1995
JP     2003-43482     2/2003
(Continued)

OTHER PUBLICATIONS

Office Action dated Aug. 20, 2019, in Japanese Patent Application No. 2015-238496, filed Dec. 7, 2015, with English-language Machine Translation.

*Primary Examiner* — Donald L Raleigh
(74) *Attorney, Agent, or Firm* — Oblon, McClelland, Maier & Neustadt, L.L.P.

(57) ABSTRACT

According to one embodiment, a display device includes a display panel including a display surface, which displays an image by selectively reflecting light entering the display surface, and an illuminating device including an optical modulator provided on a display surface side of the display panel and including a plurality of portions in a major surface thereof and a light source provided on a side surface of the optical modulator, and the illuminating device illuminates the display panel at a predetermined brightness specific for each respective portion with the light entering the optical modulator from the light source.

16 Claims, 14 Drawing Sheets

Related U.S. Application Data continuation of application No. 15/371,569, filed on Dec. 7, 2016, now Pat. No. 9,983,437.

(51) Int. Cl.
  *G02F 1/137* (2006.01)
  *G02F 1/1343* (2006.01)
  *G02F 1/1334* (2006.01)

(52) U.S. Cl.
  CPC ...... *G02F 1/1337* (2013.01); *G02F 1/133553* (2013.01); *G02F 1/134309* (2013.01); *G02F 2001/13347* (2013.01); *G02F 2001/13756* (2013.01); *G02F 2001/133616* (2013.01); *G02F 2001/133738* (2013.01)

(58) Field of Classification Search
  CPC ....... G02F 1/1334; G02F 2001/133738; G02F 2001/133616; G02F 2001/13756; G02F 2001/13347
  See application file for complete search history.

(56) References Cited

U.S. PATENT DOCUMENTS

| | | | |
|---|---|---|---|
| 7,265,800 B2 | 9/2007 | Jagt et al. | |
| 9,507,197 B2 | 11/2016 | Uchida | |
| 2009/0040422 A1 | 2/2009 | Misono | |
| 2010/0085510 A1 | 4/2010 | Okuyama et al. | |
| 2010/0123742 A1 | 5/2010 | Jang | |
| 2010/0165450 A1 | 7/2010 | Okuyama et al. | |
| 2011/0109663 A1 | 5/2011 | Uchida et al. | |
| 2011/0141551 A1 | 6/2011 | Uchida et al. | |
| 2011/0149201 A1 | 6/2011 | Powell | |
| 2011/0169877 A1* | 7/2011 | Ishida | G02F 1/1334 345/690 |
| 2011/0299882 A1 | 12/2011 | Tanaami et al. | |
| 2012/0098875 A1 | 4/2012 | Shinkai et al. | |
| 2012/0274867 A1 | 11/2012 | Shinkai et al. | |
| 2013/0229595 A1 | 9/2013 | Shinkai et al. | |
| 2014/0036176 A1 | 2/2014 | Shinkai | |
| 2014/0049734 A1 | 2/2014 | Erinjippurath | |
| 2014/0055835 A1 | 2/2014 | Shinkai et al. | |
| 2014/0104521 A1 | 4/2014 | Nishimura | |
| 2014/0192078 A1 | 7/2014 | Gilbert | |
| 2014/0240642 A1 | 8/2014 | Furukawa et al. | |
| 2014/0253609 A1 | 9/2014 | Wan | |
| 2014/0327710 A1 | 11/2014 | Xu | |
| 2014/0354709 A1 | 12/2014 | Mammen | |
| 2015/0109763 A1 | 4/2015 | Shinkai et al. | |
| 2015/0277164 A1 | 10/2015 | Nagase | |
| 2015/0293402 A1 | 10/2015 | Shinkai et al. | |
| 2015/0331386 A1 | 11/2015 | Tanaami et al. | |
| 2016/0161801 A1 | 6/2016 | Watano | |
| 2016/0300535 A1 | 10/2016 | Gilbert | |
| 2016/0306289 A1 | 10/2016 | Tanaami et al. | |
| 2017/0115527 A1 | 4/2017 | Kita | |

FOREIGN PATENT DOCUMENTS

| | | |
|---|---|---|
| JP | 2005-265920 A | 9/2005 |
| JP | 2006-201280 | 8/2006 |
| JP | 2010-92682 | 4/2010 |
| JP | 2012-14158 | 1/2012 |
| JP | 2012-252993 A | 12/2012 |

* cited by examiner

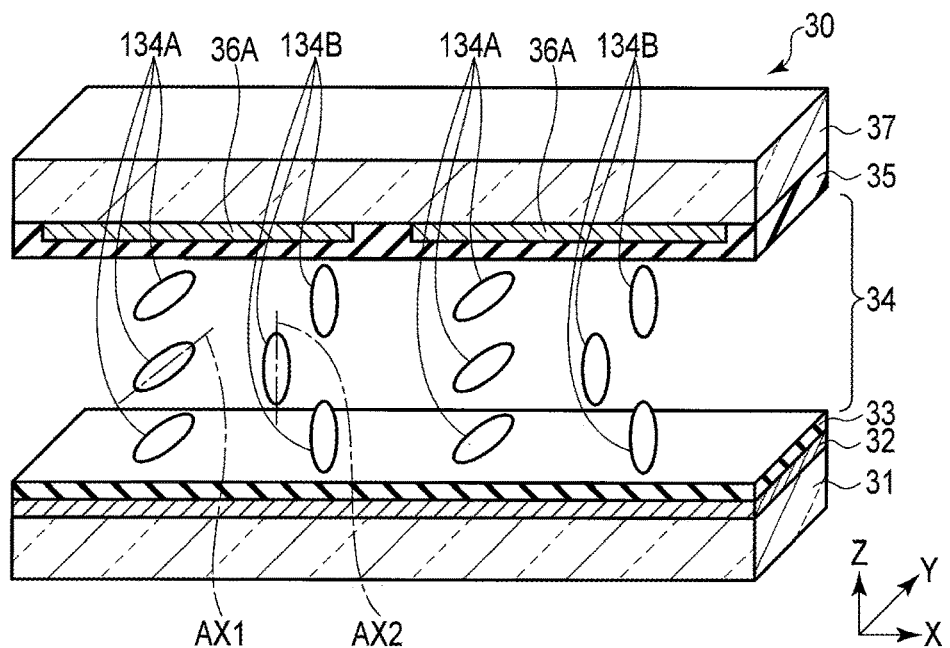
F I G. 8
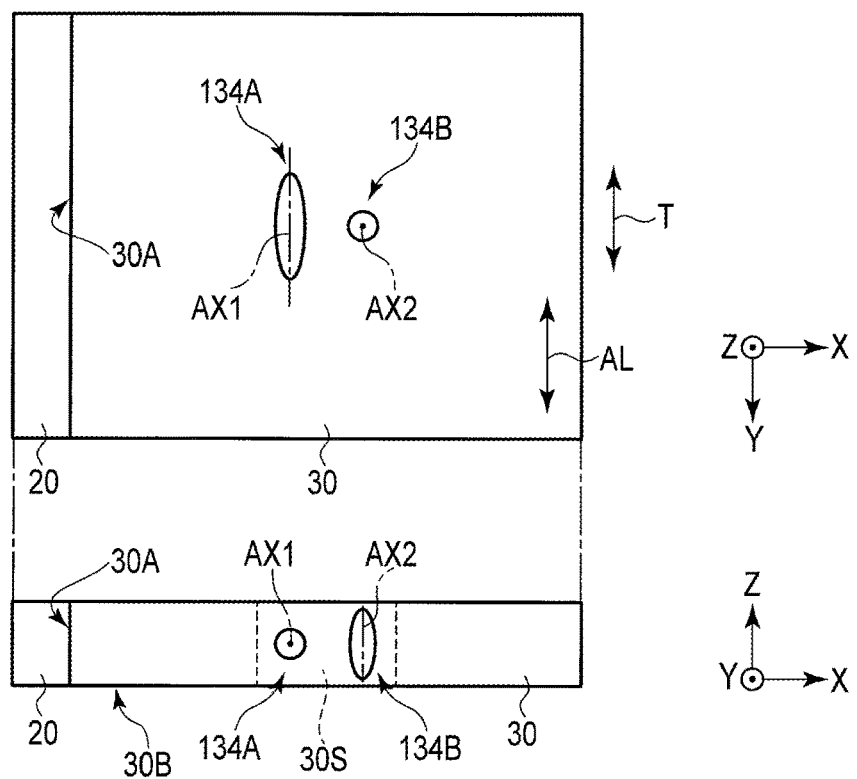
F I G. 9

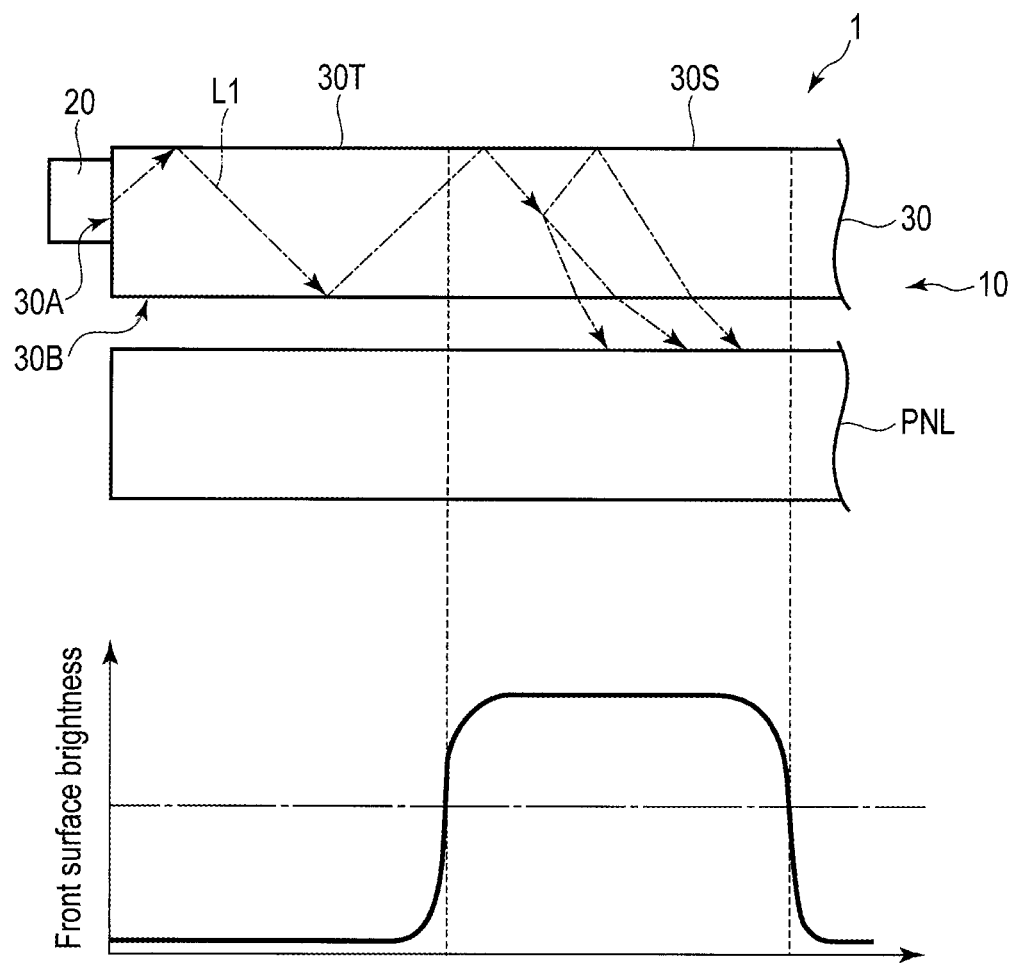
F I G. 10

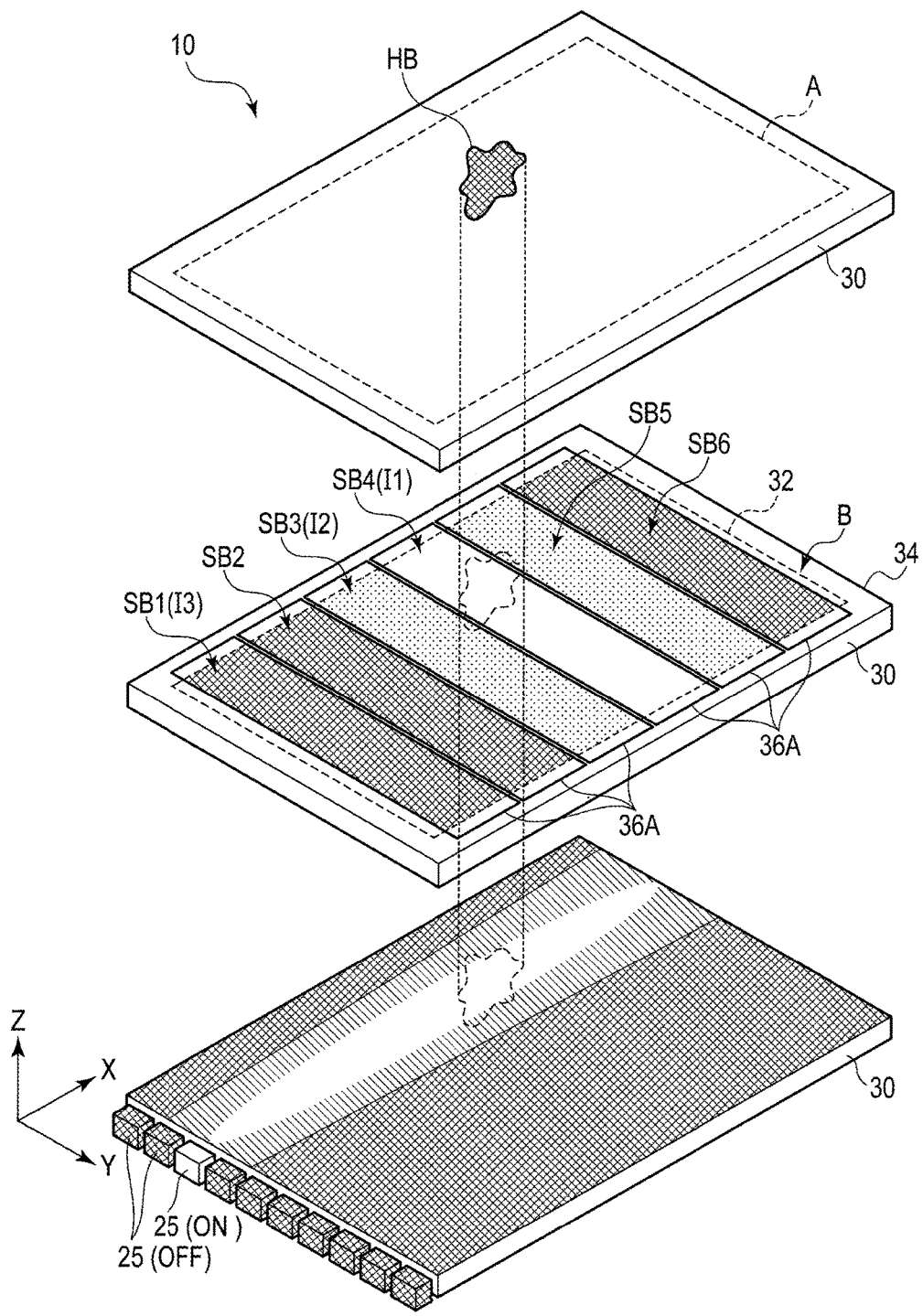
F I G. 11

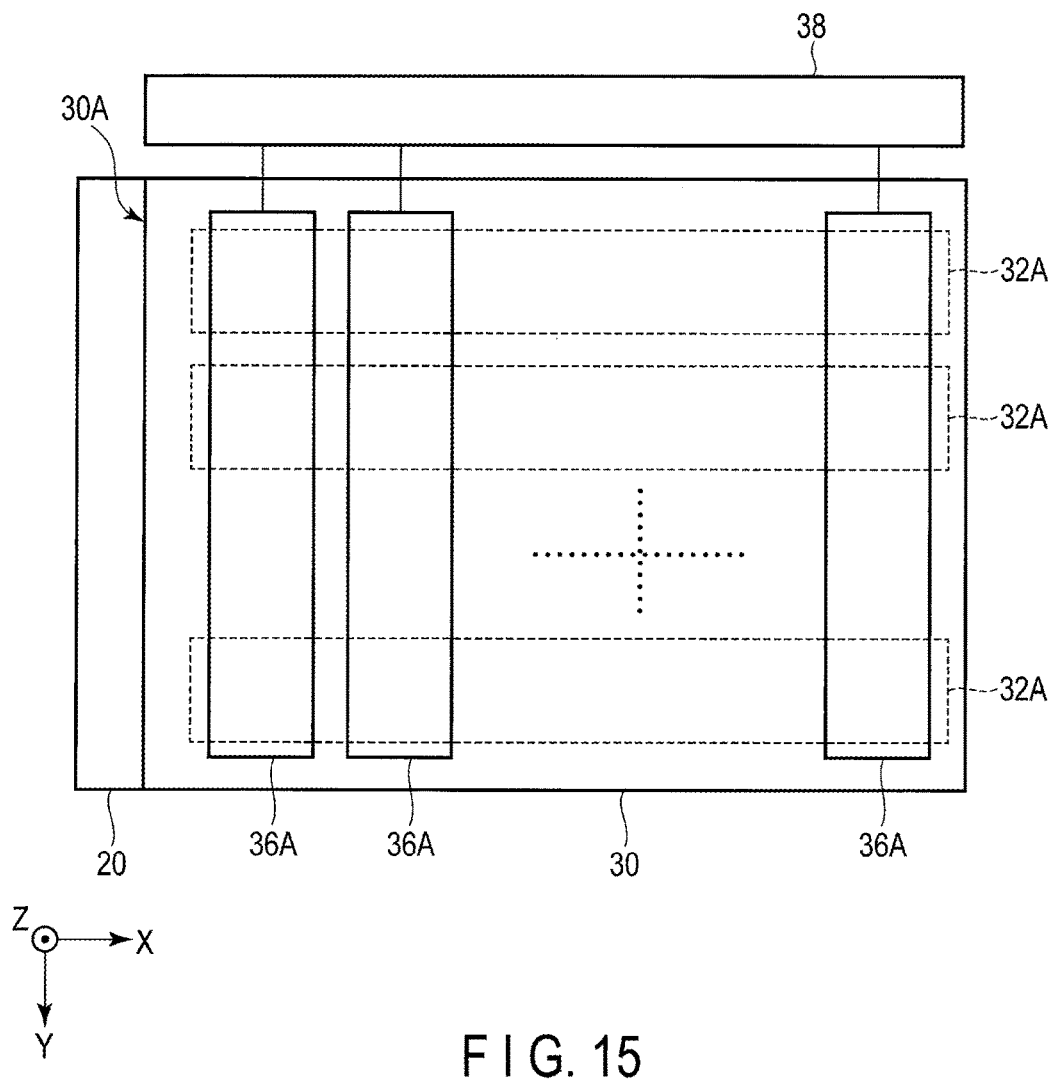
F I G. 15

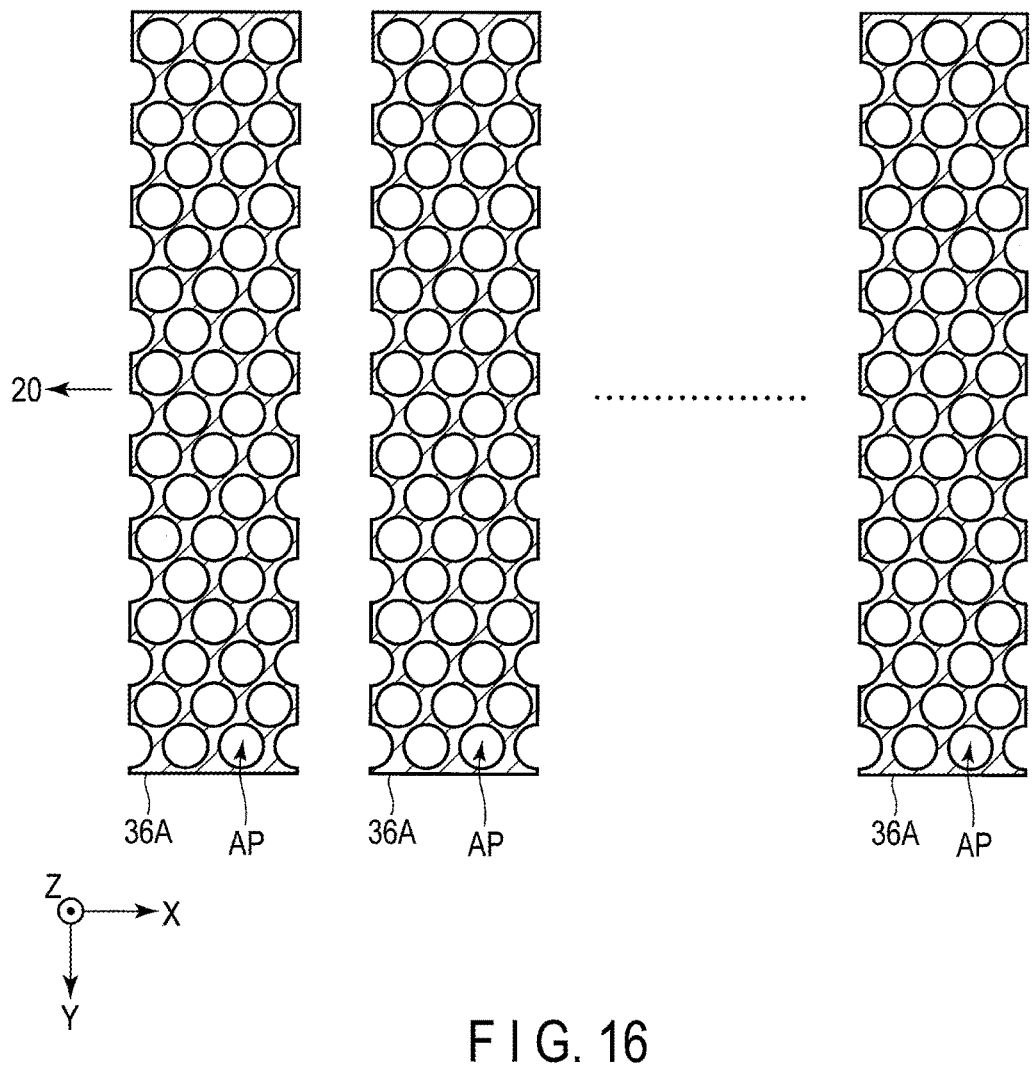
F I G. 16

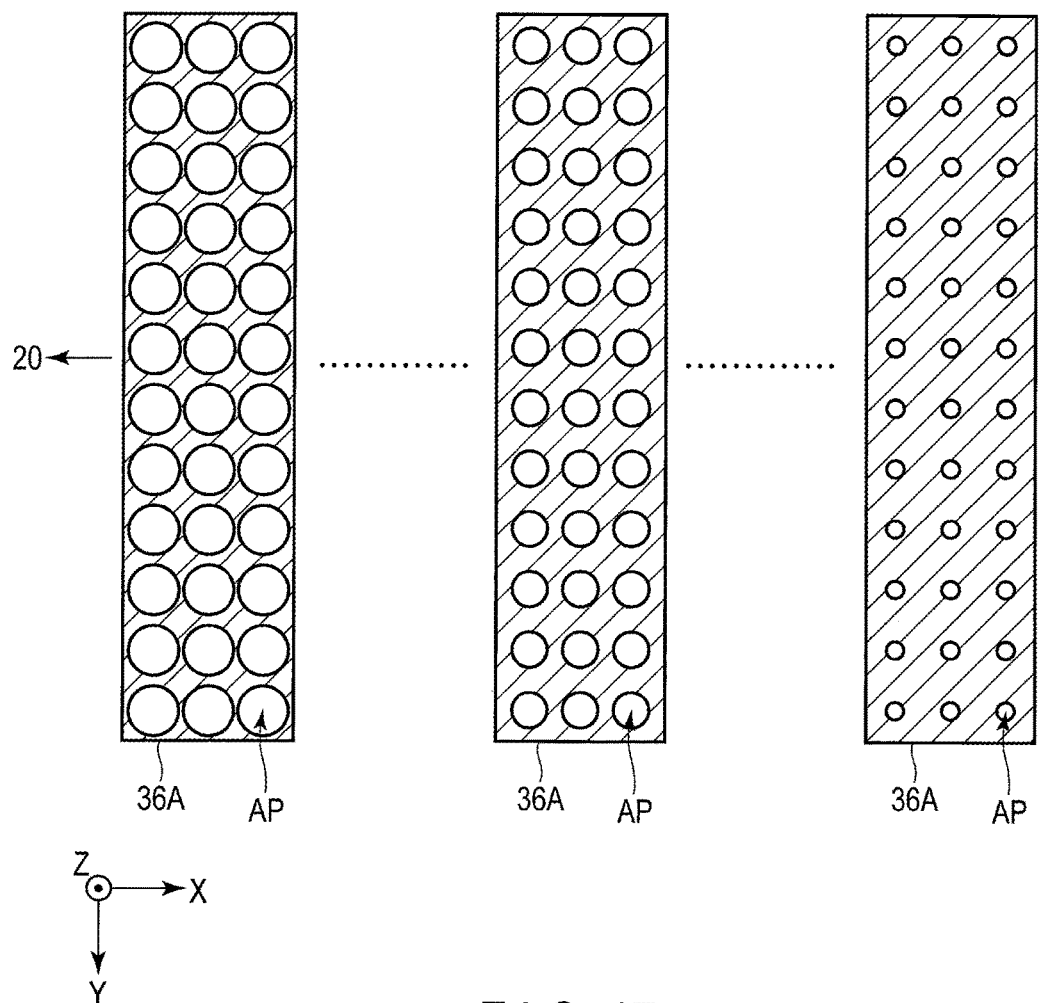
F I G. 17

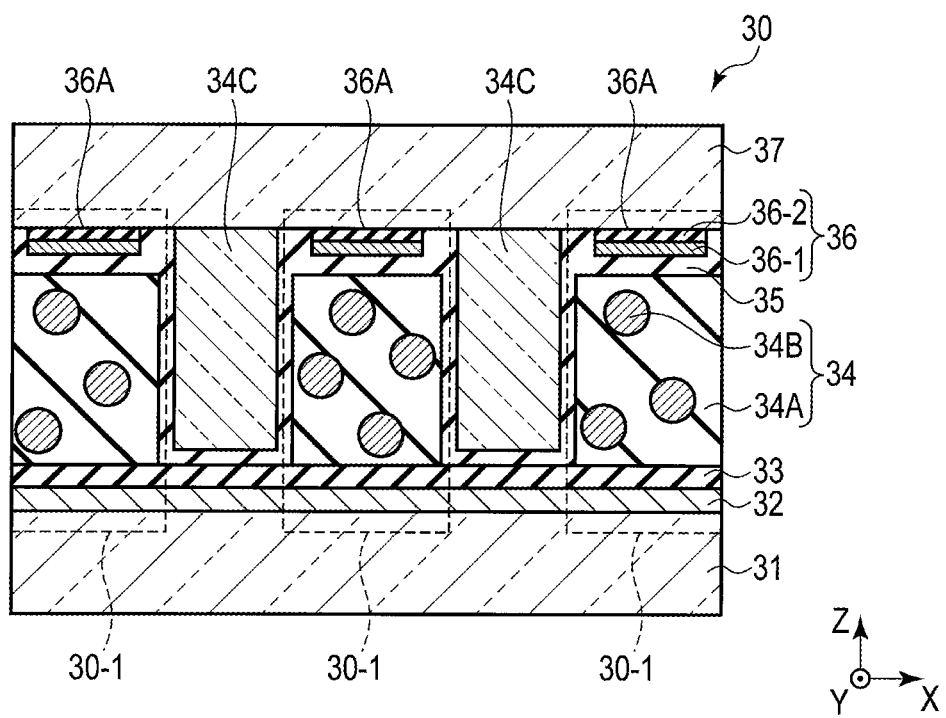
F I G. 18

DISPLAY DEVICE INCLUDING AN OPTICAL MODULATOR

CROSS-REFERENCE TO RELATED APPLICATIONS

This application is a continuation of U.S. application Ser. No. 15/958,799 filed Apr. 20, 2018, which is a continuation of U.S. application Ser. No. 15/371,569, filed Dec. 7, 2016, and is based upon and claims the benefit of priority from Japanese Patent Application No. 2015-238496, filed Dec. 7, 2015, the entire contents of each of which are incorporated herein by reference.

FIELD

Embodiments described herein relate generally to a display device.

BACKGROUND

Reflective-type display devices, which display images while controlling the reflectance of outdoor daylight, become short of the brightness of image in many cases, and therefore a lighting device (front light) may be adopted as auxiliary lighting means in their structures. However, in the conventional reflective-type display devices, the front light is lit in the entire display regardless of the type of image and therefore a wasteful increase in power consumption and degradation in contrast may occur.

BRIEF DESCRIPTION OF THE DRAWINGS

FIG. 8 is a diagram schematically showing the optical modulation layer in a state where voltage is applied.

FIG. 9 is a diagram including a top view and a cross-section of the optical modulation layer in the state shown in FIG. 8.

FIG. 10 is a diagram showing the behavior of light in the optical modulator.

FIG. 11 is a diagram showing the operation of the illuminating device when locally illuminating a high brightness portion.

FIG. 15 is a diagram showing the third modified example of the configuration of the electrode.

FIG. 16 is a diagram showing the first modified example of the configuration of the upper electrode.

FIG. 17 is a diagram showing the second modified example of the configuration of the upper electrode.

FIG. 18 is a diagram showing a modified example of the configuration of the optical modulator.

DETAILED DESCRIPTION

Figure 1:
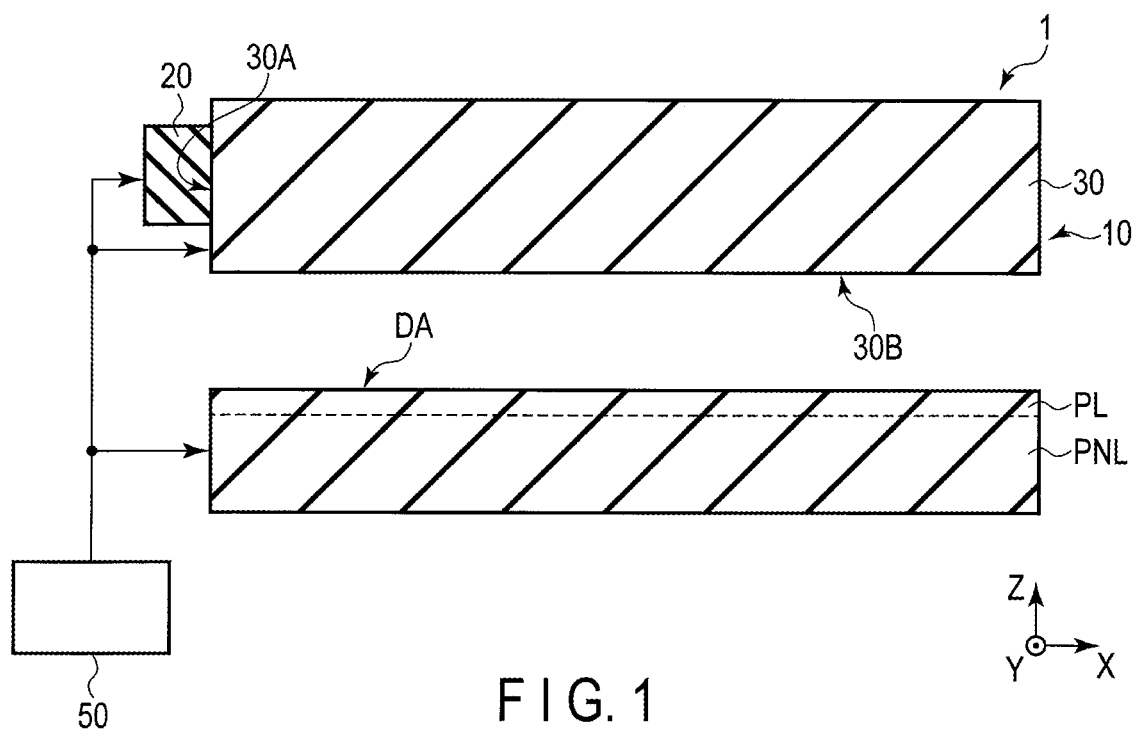
FIG. 1 is a cross-section showing a structure example of a display device according to this embodiment.

In general, according to one embodiment, there is provided a display device comprising: a display panel including a display surface, which displays an image by selectively reflecting light entering the display surface; and an illuminating device comprising an optical modulator provided on a display surface side of the display panel and including a plurality of portions in a major surface thereof and a light source provided on a side surface of the optical modulator, the illuminating device illuminating the display panel at a predetermined brightness specific for each respective portion with the light entering the optical modulator from the light source.

According to another embodiment, there is provided a display device comprising: a display panel including a display surface, which displays an image by selectively reflecting light entering the display surface; and an illuminating device comprising an optical modulator provided on a display surface side of the display panel and a light source provided on a side surface of the optical modulator, the illuminating device illuminating the display panel with the light entering the optical modulator from the light source, the optical modulator further comprising: a first transparent substrate provided on a side close to the display panel; a second transparent substrate provided on a side away from the display panel; an optical modulation layer located between the first and second transparent substrates; and first and second electrodes which apply an electric field to the optical modulation layer, and the optical modulation layer exhibiting scattering property or transparency entirely or partially to the light from the light source according to an intensity and a direction of the electric field produced with the first and second electrodes.

Embodiments will be described hereinafter with reference to the accompanying drawings. Incidentally, the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc. of the respective parts are schematically illustrated in the drawings, compared to the actual modes. However, the schematic illustration is merely an example, and adds no restrictions to the interpretation of the invention. Besides, in the specification and drawings, the structural elements having functions, which are identical or similar to the functions of the structural elements described in connection with preceding drawings, are denoted by like reference numerals, and an overlapping detailed description is omitted unless otherwise necessary.

FIG. 1 is a cross-section showing a configuration example of a display device according to this embodiment.

A display device 1 comprises an illuminating device 10, a display panel PNL and a drive circuit 50 which drives the illuminating device 10 and the display panel PNL. The display device 1 is the so-called reflective-type display device, which includes the illuminating device 10 on a display surface DA side of the display panel PNL with, and displays images by selectively reflecting the light entering the display surface DA. The display panel PNL comprises a polarizer PL disposed on a side close to the illuminating device 10.

The illuminating device 10 comprises a light source 20 and an optical modulator 30. The light source 20 is disposed on a side surface of the optical modulator 30. The optical modulator 30 is disposed to oppose the display panel PNL. The optical modulator 30 is placed away from the display panel PNL so as to oppose thereto via an air layer therebetween. The optical modulator 30 has a shape corresponding to that of the display panel PNL, for example, a rectangular parallelepiped enclosed with an upper surface, a lower surface and side surfaces. Note that of the side surfaces of the optical modulator 30, one which the light from the light source 20 enters will be referred to as a light incidence surface 30A and a bottom surface which opposes the display area DA of the display panel PNL and emits light will be referred to as a photo-irradiation surface 30B.

Figure 2:
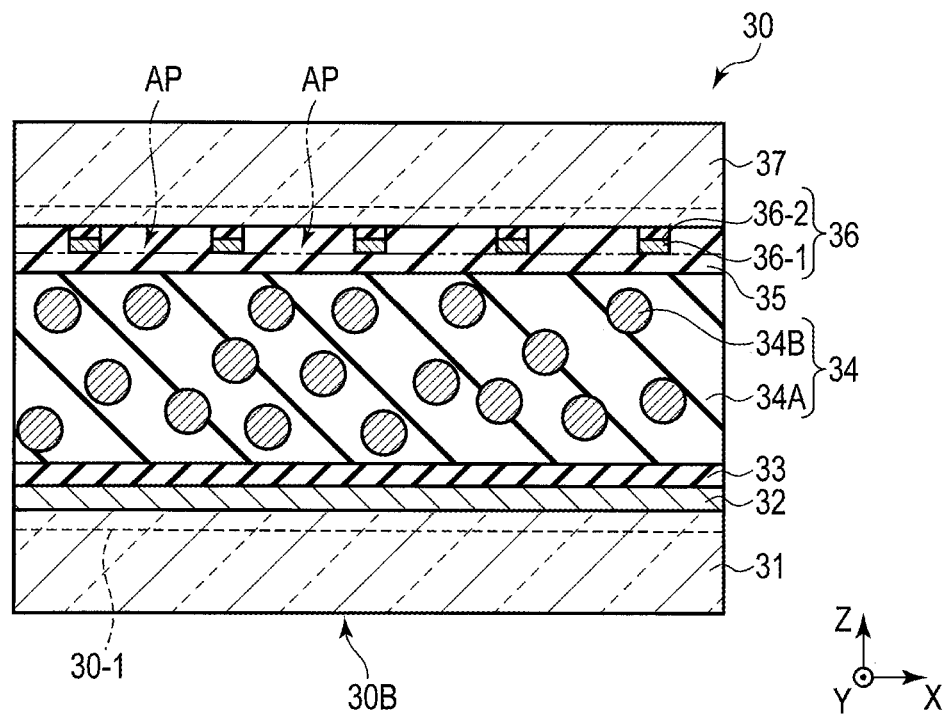
FIG. 2 is a cross section of an optical modulator shown in FIG. 1.

FIG. 2 is a cross section of the optical modulator shown in FIG. 1. The optical modulator 30 comprises a transparent substrate 31, a lower electrode 32, an alignment film 33, an optical modulation layer 34, an alignment film 35, an upper electrode 36 and a transparent substrate 37 in this order.

Of the transparent substrates 31 and 37 in pair, the transparent substrate 31 includes a photo-irradiation surface 30B situated on a side opposite to the side where the lower electrode 32 is disposed and disposed on a side close to the display panel PNL shown in FIG. 1. On the other hand, the transparent substrate 37 is disposed on a side away from the display panel PNL. The transparent substrates 31 and 37 are arranged to be away from and opposite to each other. The transparent substrates 31 and 37 support the optical modulation layer 34 and are formed from, generally, a substrate transparent to visible light, for example, a glass board or a plastic film.

Of the electrodes 32 and 36 in pair, the lower electrode 32 is provided on the surface of the transparent substrate 31, which is on the side of the optical modulation layer 34, and is a single sheet-like electrode formed over the entire surface, for example. The upper electrode 36 is provided on the surface of the transparent substrate 37, which is on the side of the optical modulation layer 34, and in the example shown, it has apertures AP to be formed discontinuously in an in-plane direction as shown in the illustrated sectional view. The upper electrode 36 comprises, for example, an optical absorption layer 36-2 located on the transparent substrate 37 side and a reflective layer 36-1 located on a side of the optical absorption layer 36-2, which is close to the transparent substrate 31.

The lower electrode 32 is formed of a transparent conductive material, for example, indium tin oxide (ITO) or indium zinc oxide (IZO)). The visible-light absorption of the transparent conductive material should preferably be as low as possible. The reflective layer 36-1 has light reflectivity and reflects the light entering the upper electrode 36 from the optical modulation layer 34 side. The reflective layer 36-1 is formed of a metal material such as aluminum or titanium. The optical absorption layer 36-2 has absorptivity to visible light and absorbs the light (outdoor daylight) entering the upper electrode 36 from the transparent substrate 37 side. The optical absorption layer 36-2 is formed of, for example, a black resin. At least one of the reflective layer 36-1 and the optical absorption layer 36-2 is formed to have conductivity. Note that in the upper electrode 36, when the optical absorption layer 36-2 has conductivity, the reflective layer 36-1 may be omitted.

The upper electrode 36 illustrated is continuous even in a region not illustrated and have the same potential. When the optical modulator 30 is seen from the direction of the normal to the optical modulator 30, the portion of the optical modulator 30, which opposes the continuous portion of the upper electrodes 36, forms the optical modulation cells 30-1. The continuous portion described above correspond to a partial electrode 36A described later with reference to FIG. 4 and a single optical modulation cell 30-1 is equivalent to a portion opposes a respective single partial electrode 36A of the optical modulator 30. The optical modulation cells 30-1 are sections separately and independently drivable by applying a predetermined voltage to the lower electrode 32 and the partial electrode 36A. According to the degree of the voltage value applied to the lower electrode 32 and the partial electrode 36A, these cells exhibit transparency or scattering property to the light from the light source 20. Note that the transparency and scattering property will be described in detail later in connection with the optical modulation layer 34.

The alignment film 33 is located between the electrode 32 and the optical modulation layer 34, and the alignment film 35 between the electrode 36 and the optical modulation layer 34. The alignment films 33 and 35 align liquid crystals and monomers used in the optical modulation layer 34, for example. There are, for example, vertical and horizontal types of alignment films and in the illustrated configuration example, horizontal alignment films are used for the alignment films 33 and 35. Examples of the horizontal alignment films are those prepared by aligning resin films such as of polyimide or polyamide imide. Examples of the alignment process are rubbing, optical alignment, etc. When using a plastic film as the transparent substrates 31 and 36, it is preferable that the calcination temperature after applying the alignment films 33 and 35 to the surface of the transparent substrates 31 and 36 in the manufacturing process should be as low as possible from a viewpoint of inhibiting the deformation of the transparent substrates 31 and 36. For this reason, it is preferable to use polyamide imide, which can be formed at a temperature of 100° C. or lower, for the alignment films 33 and 35.

Moreover, any vertical or horizontal alignment film may be sufficient if it has a function of aligning the liquid crystals and monomers. Alternatively, without use of the alignment films 33 and 35, it is possible to align the liquid crystals or monomers used in the optical modulation layer 34 by, for example, applying an electric field or a magnetic field to between the lower electrode 32 and the upper electrode 36. That is, while applying an electric field or a magnetic field to between the lower electrode 32 and the upper electrode 36, monomers are irradiated with ultraviolet rays to be polymerized, and thus the alignment state of the liquid crystals or monomers in a voltage applied state can be fixed. When using voltage for the alignment of liquid crystals or monomers, the electrodes may be formed separately for alignment and driving, or a two-frequency liquid crystal which reverses the sign of its anisotropy in dielectric constant according to frequency may be used. On the other hand, when using a magnetic field for the alignment of liquid crystals or monomers, it is preferable to use, for the liquid crystals or monomers, such a material that has a high anisotropy in magnetic susceptibility, for example, a material of compound with many benzene rings.

The optical modulation layer 34 is provided between a pair of transparent substrates 31 and 37. The optical modulation layer 34 exhibits scattering property or transparency entirely or partially with respect to the light from the light source 20 according to the intensity or direction of the electric field produced by the electrodes 32 and 36. More specifically, the optical modulation layer 34 exhibits transparency to the light from the light source 20 when voltage is not applied to the lower electrode 32 and the upper electrode 36, whereas it exhibits scattering property to the light from the light source 20 when voltage is applied to the lower electrode 32 and the upper electrode 36. The optical modulation layer 34 is a complex layer which contains, for example, a bulk 34A and a number of fine particles 34B distributed in the bulk 34A. The bulk 34A and the fine particles 34B have optical anisotropy. The fine particles 34B are equivalent to a first region, and the bulk 34A is equivalent to a second region.

The bulk 34A and the fine particles 34B have different response speeds to an electric field. The bulk 34A has, for example, a fibrous or porous structure which does not respond to an electric field, or a fibrous or rod-like structure having a response speed slower than that of the fine particles 34B. The bulk 34A is formed of, for example, a polymeric material obtained by polymerizing low-molecular monomers. The bulk 34A is formed by, for example, polymerizing an alignable and polymerizable material (for example, monomers) aligned along an alignment direction of the alignment films 33 and 35 with at least one of heat and light.

On the other hand, the fine particles 34B are prepared to mainly contain a liquid crystal material, for example and have a response speed sufficiently higher than that of the bulk 34A. The liquid crystal material (liquid crystal molecules) contained in the fine particles 34B is, for example, of rod-like molecules. The liquid crystal molecules contained in the fine particles 34B should preferably have a positive anisotropy in dielectric constant (the so-called positive type liquid crystals). When the bulk 34A has a fibrous or rod-like structure, the liquid crystal molecules of the fine particles 34B are aligned, for example, parallel to the longitudinal direction (the alignment direction) of the fibrous or rod-like structure of the bulk 34A.

The alignable or polymerizable monomers, which form the bulk 34A, should only be a material having optical anisotropy and compoundable with liquid crystal, and it is preferable in this embodiment that the monomers should be low-molecule monomer which harden by ultraviolet rays. Here, it is preferable that the liquid crystal material and the member formed by polymerizing low-molecule monomers (polymeric material) match in the direction of the optical anisotropy while not applying voltage. Therefore, the liquid crystal material and the low-molecule monomers should be aligned in the same direction before ultraviolet curing. When the liquid crystal material is used as the fine particles 34B and the liquid crystal material is of the rod-like molecules, it is preferable that the structure of the monomer material used here should as well be a rod-like. Based on the above-described descriptions, the monomer material should preferably have both polymerizable property and liquid crystallinity, and should contain, for example, at least one functional group selected from the group consisting of an acrylate group, a methacrylate group, an acryloyloxy group, a methacryloyloxy group, a vinyl ether group, and an epoxy group, as the polymerization functional group. These functional groups can be polymerized by irradiating ultraviolet rays, infrared rays or electron beams thereto or heating. In order to suppress the degrading of the alignment degree at ultraviolet exposure, a liquid crystalline material having a multi-functional group may be added as well. When the bulk 34A is prepared to have the fibrous structure described above, it is preferable that bifunctional liquid crystalline monomers be employed as the materials of the bulk 34A. Moreover, to the materials of the bulk 34A, a monofunctional monomer may be added for the purpose of adjusting the temperature at which the liquid crystallinity is exhibited, or a tri- or more functional monomer may as well be added for the purpose of improving the linkage density.

Figure 3:
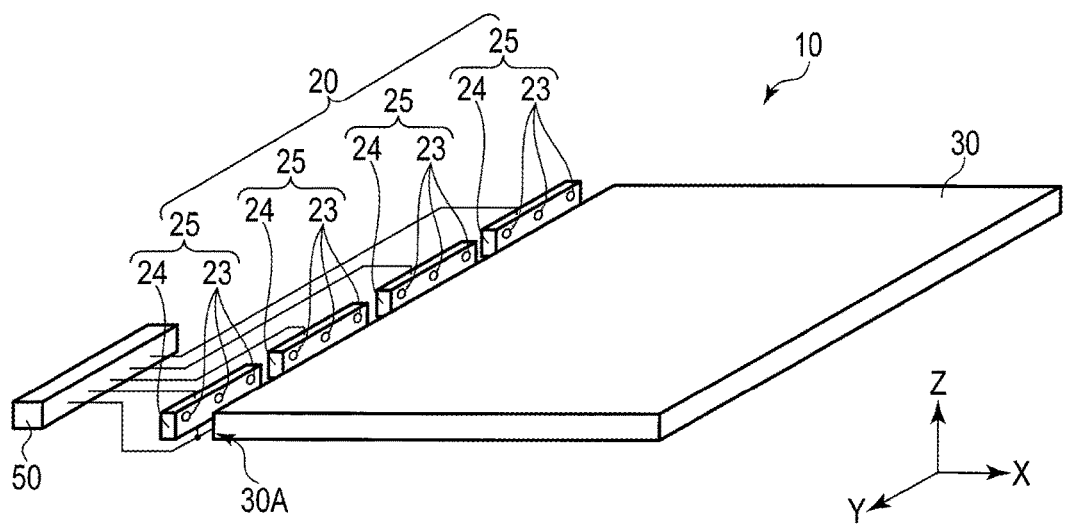
FIG. 3 is a diagram showing the structure of an illuminating device shown in FIG. 1.

FIG. 3 is a diagram showing the structure of the illuminating device shown in FIG. 1.

The light source 20 has a structure in which, for example, a plurality of dot-like light emitters 23 are arranged in a row along a second direction Y. Each dot-like light emitter 23 is prepared to emit light toward the light incidence surface 30A, and formed from a light emitting device which includes a light-emission spot in its surface opposite to the light incidence surface 30A. Examples of the light-emitting device are LED and laser diode (LD).

The dot-like light emitters 23 may be arranged, for example, on a common substrate 24 in units of two or more dot-like light emitters 23. In this case, a light source block 25 comprises one substrate 24 and two or more dot-like light emitters 23 arranged in the substrate 24. The substrate 24 is a circuit board in which, for example, wiring lines which electrically connect the dot-like light emitters 23 to the drive circuit 50 are formed and the dot-like light emitters 23 are mounted on this circuit board. Each unit of the dot-like light emitters 23 (the dot-like light emitters 23 in one light source block 25) is arranged on the common substrate 24 so as to be connected, for example, in parallel or in series to each other, though not illustrated, and driven by block (non-independently) by the drive circuit 50. Moreover, the dot-like light emitters 23 arranged on different substrates 24 (those of each light source block 25) are connected to, for example, current paths different from each other, to be driven independently by the drive circuit 50, for example. Although not illustrated, the dot-like light emitters 23 provided in the different substrates 24 (those of each light source block 25) may be connected, for example, in parallel or in series to each other to be driven by block (non-independently) by the drive circuit 50, for example. The light source 20 may be provided in only one side surface of the optical modulator 30, or two side surfaces (for example, two side surfaces opposing each other) of the optical modulator 30.

Figure 4:
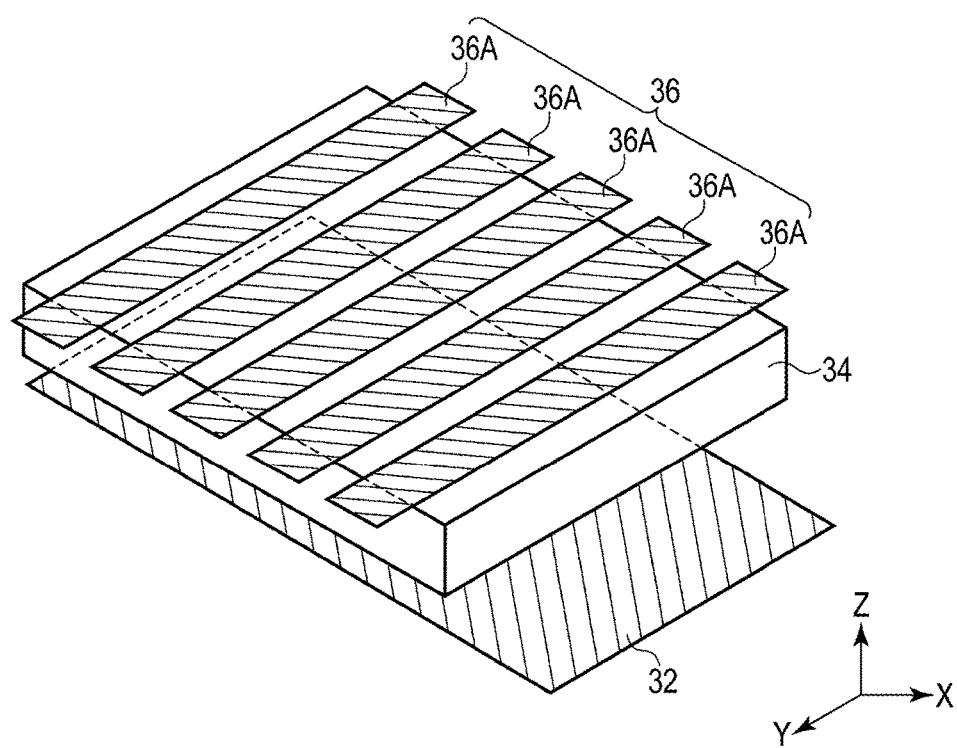
FIG. 4 is a diagram showing the structure of an electrode shown in FIG. 2.

FIG. 4 is a diagram showing the structure of the electrode shown in FIG. 2.

The upper electrode 36 comprises, for example, a plurality of belt-like partial electrodes 36A arranged parallel to each other. The partial electrodes 36A are each extending, for example, in the second direction Y, i.e., the direction parallel to the light incidence surface 30A and are arranged in the first direction X, that is, the direction which orthogonally intersects the light incidence surface 30A. The partial electrodes 36A are electrically separated from each other and voltage is applied individually and independently thereto. Note that the partial electrodes 36A may be electrically connected to each other. On the other hand, the lower electrode 32 is, for example, a sheet-like electrode which opposes the partial electrodes 36A along a third direction Z via the optical modulation layer 34.

The shapes of the upper and lower electrode 36 and 32 are not particularly limited. For example, the lower electrode 32 may comprises a plurality of partial electrodes arranged parallel to each other. Note that though an illustration is omitted, a pair of electrodes which form an electric field in the optical modulation layer 34 may be both located on the same side of the optical modulation layer 34. Such a pair of electrodes is arranged alternately, for example, in the first direction X or the second direction Y to form a horizontal electric field parallel to an X-Y plane in the optical modulation layer 34.

Figure 5:
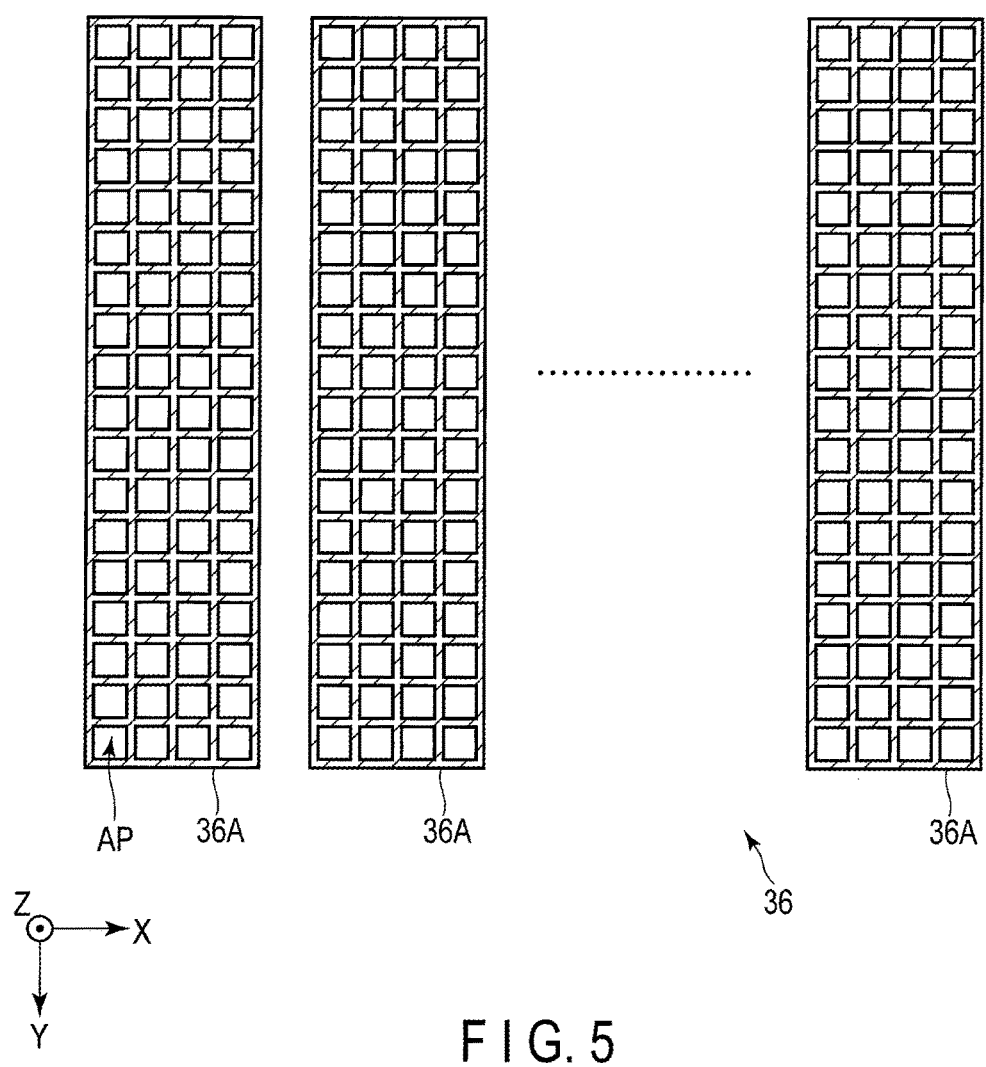
FIG. 5 is a diagram showing the structure of an upper electrode shown in n FIG. 4.

FIG. 5 is a diagram showing the structure of the upper electrode shown in FIG. 4.

The partial electrodes 36A each comprise a plurality of apertures AP. In the illustrated example, the shape of the apertures AP is quadrangular, but, not particular limited to this. It may circular, elliptical, polygon or the like. The density of apertures AP (the occupying ratio of apertures of the partial electrode 36A AP per unit area), for example, may be equal or different between the partial electrodes 36A. The density of apertures AP can be adjusted by changing the diameter of each aperture AP or the number of the apertures AP. Note that the density of apertures AP should preferably be higher than the pattern density of the partial electrodes 36A (the occupying ratio of the area other than the apertures AP of the partial electrode 36A per unit area). With this structure of the display device 1, the transmissivity of images displayed on the display panel PNL to the optical modulator 30 can be improved.

Figure 6:
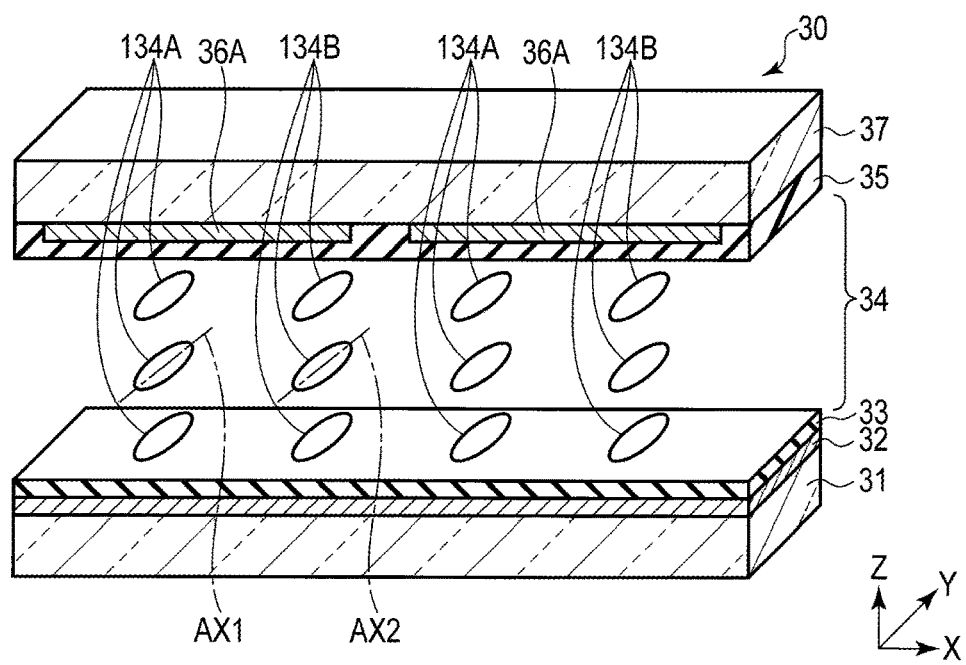
FIG. 6 is a diagram schematically showing an optical modulation layer in a state where voltage is not being applied.

FIG. 6 is a diagram schematically showing the optical modulation layer in the state where voltage is not applied.

FIG. 6 schematically illustrates an example of an alignment state in the bulk 34A and the fine particles 34B while voltage is not being applied to between the lower electrode 32 and the partial electrodes 36A.

Elliptical bodies 134A each illustrate an example of an index ellipsoid which exhibits the anisotropy in refractive-index of the bulk 34A while voltage is being not applied to between the lower electrode 32 and the partial electrodes 36A. Elliptical bodies 134B each illustrate an example of an index ellipsoid which exhibits the anisotropy in refractive-index of the fine particles 34B while voltage is being not applied to between the lower electrode 32 and the partial electrodes 36A. The index ellipsoids represent by the form of tensor ellipses the refractive index of linearly polarized light entering from various directions. By checking the section of the ellipse from the light-entering direction, it is possible to know the refractive index geometrically.

The bulk 34A and the fine particles 34B have the composition, for example, in which an optical axis AX1 of the bulk 34A (specifically, the longitudinal axis of the elliptical bodies 134A) and an optical axis AX2 of the fine particles 34B (specifically, the longitudinal axis of the elliptical bodies 134B) match in direction (that is, parallel to each other) while voltage is not being applied to between the lower electrode 32 and the upper electrodes 36. Note that the optical axes AX1 and AX2 each indicates an axial line parallel to the travelling direction of light by which the refractive index has one value regardless of the polarization direction. Moreover, when voltage is not applied to between the lower electrode 32 and the upper electrodes 36, the directions of the optical axes AX1 and AX2 need not always to match with each other, but the directions thereof may be somewhat drifted by an error, for example, during the manufacturing process.

Figure 7:
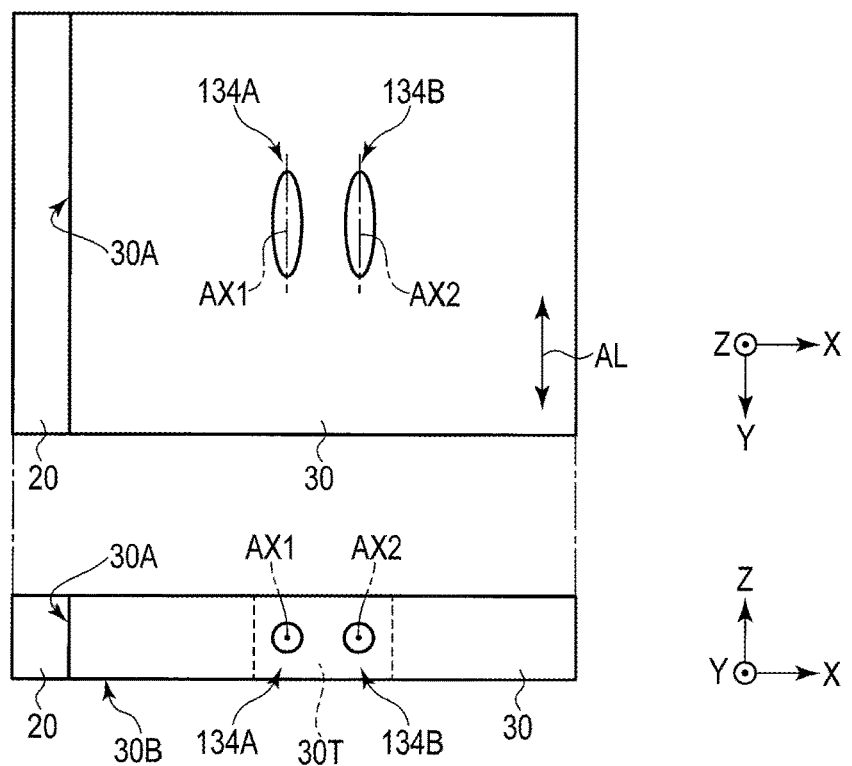
FIG. 7 is a diagram including a top view and a cross-section of the optical modulation layer in the state shown in FIG. 6.

FIG. 7 is a diagram including plane and section views of the optical modulation layer in the state shown in FIG. 6.

When voltage is not applied to between the lower electrode 32 and the partial electrodes 36A, the optical axis AX2 is parallel (or substantially parallel) to the light incidence surface 30A of the optical modulator 30 as well as to the photo-irradiation surface 30B. In other words, when voltage is not applied to between the lower electrode 32 and the upper electrodes 36, the optical axis AX2 is parallel (or substantially parallel) to a plane including the partial electrodes 32A or the upper electrode 36 and also to the extending direction of the partial electrodes 32A.

On the other hand, the optical axis AX1 is parallel (or substantially parallel) to the light incidence surface 30A of the optical modulator 30 as well as to the photo-irradiation surface 30B. That is, when voltage is not applied to between the lower electrode 32 and the partial electrodes 36A, the optical axis AX1 is parallel (or substantially parallel) to the optical axis AX2.

It is preferable here that the bulk 34A and the fine particles 34B be equal to each other in terms of the ordinary light refractive index and also the extraordinary light refractive index. In this case, for example, when voltage is not applied to between the partial electrode 32A and the upper electrodes 36, no substantial difference in refractive index is created among all directions including front and oblique directions, thereby achieving high transparency. Thus, for example, the light traveling in the front direction and oblique directions can be transmitted through the optical modulation layer 34 without being scattered therewithin.

FIG. 8 is a diagram schematically showing the optical modulation layer in the state where voltage is applied.

FIG. 8 schematically illustrates an example of the alignment state in the bulk 34A and the fine particles 34B when voltage is being applied to between the lower electrode 32 and the partial electrodes 36A.

Elliptical bodies 134A each illustrate an example of an index ellipsoid which exhibits the anisotropy in refractive-index of the bulk 34A while voltage is being applied to between the lower electrode 32 and the partial electrodes 36A. Elliptical bodies 134B each illustrate an example of an index ellipsoid which exhibits the anisotropy in refractive-index of the fine particles 34B while voltage is being applied to between the lower electrode 32 and the partial electrodes 36A.

The bulk 34A and the fine particles 34B have the composition, for example, in which the optical axis AX1 and the optical axis AX2 differ form each other in extending direction (that is, intersect or orthogonally intersect) while voltage is being applied to between the lower electrode 32 and the upper electrodes 36.

FIG. 9 is a diagram including a plane view and cross-section of the optical modulation layer in the state shown in FIG. 8.

When voltage is being applied to between the lower electrode 32 and the partial electrodes 36A, for example, the fine particles 34B have the composition in which the optical axis AX2 is parallel (or substantially parallel) to the light incidence surface 30A of the optical modulator 30 and also to the normal of the photo-irradiation surface 30B. In other words, when voltage is being applied to between the lower electrode 32 and the partial electrodes 36A, the optical axis AX2 intersects orthogonally (or substantially orthogonally) to a plane including the lower electrode 32 or the partial electrodes 36A.

On the other hand, the bulk 34A has the composition in which the optical axis AX1 is set in a constant direction regardless of whether or not voltage is applied to between the lower electrode 32 and the partial electrodes 36A. That is, the optical axis AX1 is parallel (or substantially parallel) to the light incidence surface 30A and also to the photo-irradiation surface 30B. In other words, when voltage is being applied to between the lower electrode 32 and the partial electrodes 36A, the optical axis AX1 and the optical axis AX2 intersect orthogonally (or substantially orthogonally).

Therefore, when voltage is being applied to between the lower electrode 32 and the partial electrodes 36A, a difference in refractive index is produced between the bulk 34A and the fine particles 34B, and thus the scattering property is obtained in the optical modulation layer 34. Therefore, for example, the light travelling in the front direction and oblique directions is scattered within the optical modulation layer 34.

Thus, the liquid crystal molecules in the fine particles 34B exhibit the above-described variations depending on whether or not voltage is applied. But in the process of the variations, the bulk 34A does not respond to voltage change, and the longitudinal axial of the fibrous structure of the bulk 34A is directed along the alignment direction AL of the alignment films 33 and 35 (a direction parallel to the light incidence surface 30A). Therefore, when voltage is being applied to between the lower electrode 32 and the upper electrodes 36, the light output from the light source 20 and propagating inside the optical modulation layer 34 travels at a period corresponding to the short axial average size of the fibrous members in the fibrous structure of the bulk 34A while being influenced by the effect of the difference between the extraordinary-light refractive index of the fine particles 34B and the ordinary light refractive index of the bulk 34A. Consequently, the light propagating inside the optical modulation layer 34 scatters greatly in the thickness direction of the optical modulation layer 34, but does not scatter much in a direction parallel to the light incidence surface 30A. That is, the optical modulation layer 34 exhibits anisotropic scattering property to the light output from the light source 20 and propagating inside the optical modulation layer 34. Note that the longitudinal axis of the fibrous structure of the bulk 34A is parallel also to the transmission axis T of the polarizer Pt.

In addition, the difference in refractive index in the bulk 34A (between the extraordinary-light refractive index and the ordinary light refractive index) and that of the fine particles 34B should preferably be great as possible, more specifically, it should be 0.05 or greater, or more preferably 0.1 or greater, or still more preferably, 0.15 or greater. It is because when the refractive index difference in the bulk 34A and the fine particles 34B is great, the scatterability of the optical modulation layer 34 is improved to break the light guiding conditions, making it easier to take out the light from the optical modulator 30.

FIG. 10 is a diagram showing the behavior of light in the optical modulator.

Light L1 (from an oblique direction) from the light source 20 is totally reflected on an interface (between one of the transparent substrates 31 and 37 and air) in a transmitting portion 30T, which is a transparent portion of the optical modulator 30, and guided within the optical modulator 30. As a result, the brightness of the photo-irradiation surface 30B of the transmitting portion 30T is lower as compared to the case where the optical modulator 30 is merely a light guide plate which does not include the optical modulation layer 34 (as indicated by alternate long and short dash lines in the figure).

The lights L1 scatters in the direction parallel to the light incidence surface 30A in a scattering portion 30S, which is a portion of the optical modulator 30 which is in a scattering state. The light scattering on the photo-irradiation surface 30B side transmits the interface (between the transparent substrate 31 and air), whereas the light scattering on the upper electrode 36 side is reflected on the reflective layer 36-1 towards the photo-irradiation surface 30B side. Thus, the brightness of the photo-irradiation surface 30B of the scattering portion 30S is significantly higher as compared to the case where the optical modulator 30 is a light guide plate which does not comprise the optical modulation layer 34 (indicated by the alternate long and short dash line in FIG. 8). Further, the brightness of partial white display (push-up of brightness) is increased by an equivalent level that the brightness of the transmitting portion 30T decreased.

The illuminating device 10 can switch over the transmitting portion 30T and the scattering portion 30S to each other in each optical modulation cell 30-1 which is a region opposing the partial electrode 36A. That is, the illuminating device 10 includes a plurality of portions in a major surface of the optical modulator 30, and illuminates the display panel PNL by each portion having a respective predetermined brightness.

FIG. 11 is a diagram showing the operation of the illuminating device when locally illuminating a high brightness section. In this configuration example, the illuminating device 10 can realize local dimming which can adjust two-dimensionally the luminance distribution of the light emitted from the photo-irradiation surface 30B with the light source block 25 and the optical modulator 30. An example of use of the local dimming will be described.

In the illustrated example, the illuminating device 10 includes sub-areas SB1 to SB6 in a to-be-illuminated area A of the optical modulator 30. The sub-areas SB1 to SB6 are regions corresponding to the optical modulation cells 30-1, respectively, and can separately and independently switch the transmitting portion 30T and the scattering portion 30S over to each other. When an image displayed on a region corresponding to the to-be-illuminated area A include a high brightness portion HB which has brightness higher than that of the surrounding areas, each light source block 25 and the optical modulator 30 are controlled to illuminate the position corresponding to the high brightness portion HB with high intensity.

In the illustrated example, those of the light source blocks 25 which correspond to the position of the high brightness portion HB along the first direction X are turned on (ON), and the other light source blocks 25 are turned off (OFF). With this operation, light is guided to the region corresponding to the turned-on light source blocks 25 in the optical modulator 30 and light is not guided to the other regions. Further, the optical modulator 30 is controlled so as to make the sub-areas SB3, SB4 and SB5, which correspond to the position of the high brightness portion HB along the second direction Y, to become the scattering portion 30S described above with reference to FIG. 10, and the other sub-areas SB1, SB2 and SB6 to become the transmitting portion 30I also described above with reference to FIG. 10. In other words, the optical modulator 30 changes the scattering intensity of light for each portion of the region of the to-be-illuminated area A, to which light is actually guided. In this manner, the light emitted from the illuminating device 10 has high brightness in the vicinity of the high brightness portion HB, and low brightness in the other portions.

In the illustrated example, the optical modulator 30 is controlled so that the sub-area SB4 having the largest overlapping area with the high brightness portion HB, exhibits a first (highest) scattering intensity I1, the sub-area SB3 and SB5 having an overlapping area with the high brightness portion HB smaller than those of the sub-area SB4, exhibit a second scattering intensity I2 lower than the first scattering intensity I1 (I1>I2), and the sub-areas SB1, SB2 and SB6 which do not overlap with the high brightness portion HB, exhibit a third scattering intensity I3 lower than the second scattering intensity I2 (I2>I3). FIG. 11 illustrates various scattering intensities by difference hatchings. Thus, the scattering intensity of the sub-area SB is controlled in a multi-stage manner, the contrast of the display image can be more finely adjusted.

Figure 12:
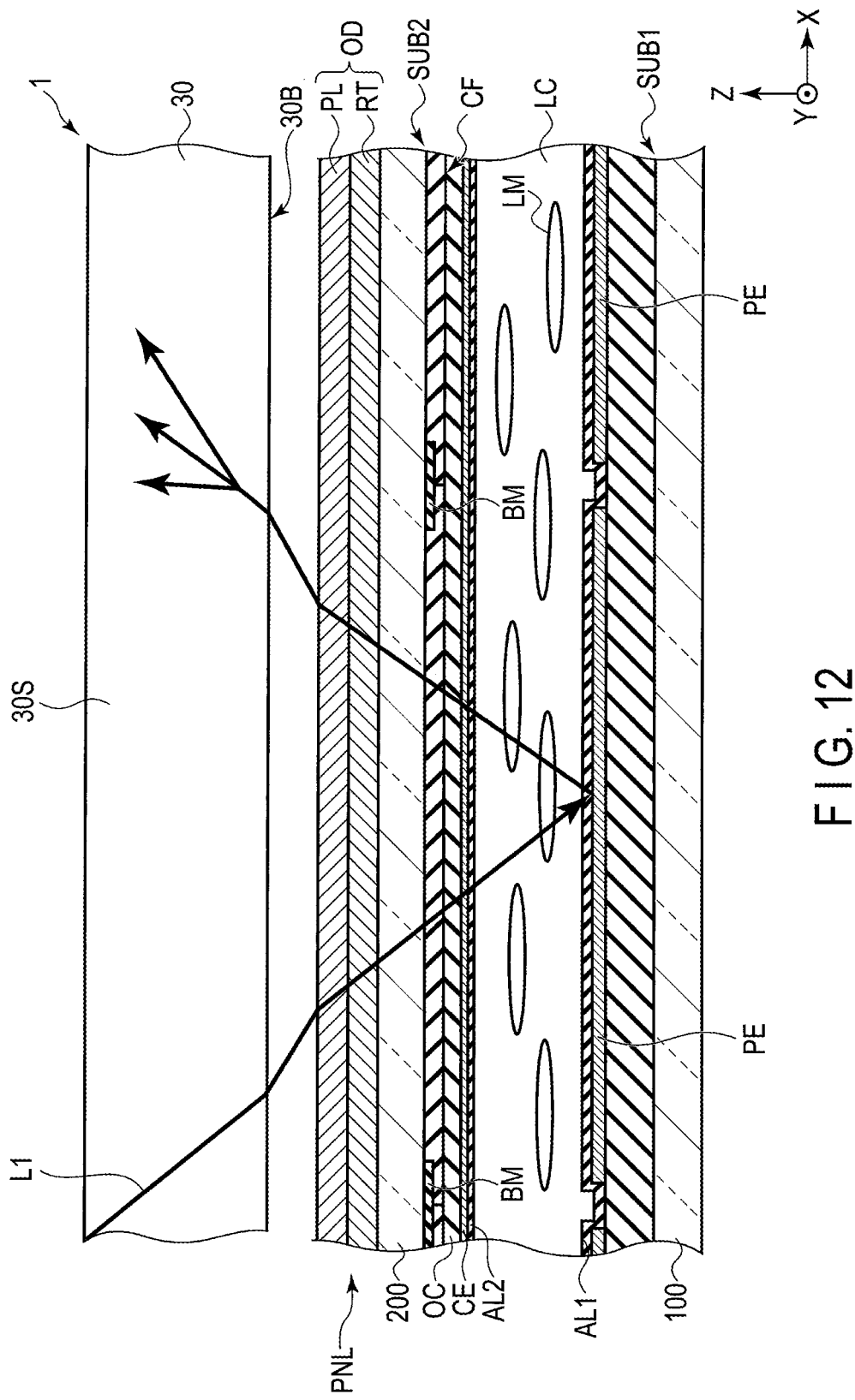
FIG. 12 is a cross section of a configuration example of a display panel.

FIG. 12 is a cross-section of a configuration example of the display panel. Here, only the structural parts required to be explained are illustrated.

The display panel PNL comprises a first substrate SUB1, a second substrate SUB2, a liquid crystal layer LC and an optical device OD. The second substrate SUB2 is disposed to oppose the first substrate SUB1 and located on a side closer to the optical modulator 30 than the first substrate SUB1.

The first substrate SUB1 comprises a first insulating substrate 100, a pixel electrode PE, a first alignment film AL1 and the like. Although not illustrated, the first substrate SUB1 comprises, in addition to various wiring lines, a switching element which controls the application of voltage to the pixel electrode PE. The pixel electrode PE is located on a side opposing the second substrate SUB2 of the first insulating substrate 100. The pixel electrode PE is equivalent to a reflecting electrode and includes a reflective layer formed of a metal with light reflectivity, such as aluminum or silver. The first alignment film AL1 covers the pixel electrode PE.

The second substrate SUB2 comprises a second insulating substrate 200, light-shielding layers BM, a color filter layer CF, an overcoat layer CC, a common electrode CE, a second alignment film AL2 and the like.

The light shielding layers BM are located on a side opposing the first substrate SUB1 of the second insulating substrate 200. In the illustrated example, each light-shielding layer BM opposes a cap between an adjacent respective pair of the pixel electrodes PE. The color filter layer CF is located on a side opposing the first substrate SUB1 of the second insulating substrate 200 and partially overlaps the light-shielding layers BM. Although will not be explained in full detail, the color filter layer CF comprises, for example, a red color filter, a green color filter and a blue color filter. The red color filter is disposed on a pixel displaying red. The green color filter is disposed on a pixel displaying green. The blue color filter is disposed on a pixel displaying blue. Note that the color filter layer CF may include a filter of some other color such as white, or a transparent layer.

The overcoat layer CC covers the color filter layer CF. The common electrode CE is located on a side opposing the first substrate SUB1 of the overcoat layer OC. The common electrode CE opposes the pixel electrodes PE. The common electrode CE is formed from a transparent conductive material such as ITO or IZO. The second alignment film AL2 covers the common electrode CE.

Note that in a boundary between pixels displaying different colors, a plurality of filters of different colors are stacked one another, which can reduce the transmissivity, and therefore the light shielding layer BM may be omitted from the second substrate SUB2. In a display panel PNL of the monochrome type, the color filter layer CF may be omitted.

The liquid crystal layer LC is held between the first substrate SUB1 and the second substrate SUB2 and contains liquid crystal molecules LM located between the first alignment film AL1 and the second alignment film AL2. The liquid crystal molecules LM are initially aligned in a predetermined direction by an alignment regulation force of the first alignment film AL1 and the second alignment film AL2.

The optical device OD is located on a side close to the optical modulator 30 of the second substrate SUB2. The optical device OD comprises, for example, a retardation film RT, a polarizer PL and the like. The retardation film RT has the function of a quarter-wave plate. For example, the retardation film RT is a multilayered body in which a quarter-wave plate and a half-wave plate are stacked, which reduces the wavelength dependence to be able to obtain a desired phase difference within the wavelength range used for color display. As described above, the transmission axis T of the polarizer PL extends along the direction parallel to the longitudinal axis of the fibrous structure of the bulk 34A. That is, the transmission axis T of the polarizer PL extends in the second direction Y.

Next, the operation of the reflective-type liquid crystal display device illustrated will be described. Note that in the description, an ON state refers to a state where voltage is applied to the pixel electrodes PE and the common electrode CE, whereas an OFF state refers to a state where voltage is not applied to the pixel electrodes PE and the common electrode CE.

The light L1 guided inside the optical modulator 30 is scattered in the scattering portion 30S and emitted from the photo-irradiation surface 30B. Here, when the transmission axis T of the polarizer PL and the longitudinal axis of the fibrous structure of the bulk 34A are parallel to each other, the light L1 scattered in the optical modulation layer 34 are polarized in the direction parallel to the transmission axis T of the polarizer PL. When the light L1 emitted from the photo-irradiation surface 30B transmits through the polarizer PL, during which the light L1 improves the degree of polarization to become linearly polarized light. Then, when the light L1 transmits the retardation film RT, to convert into circularly polarized light. The light L1 colored by the color filter layer CF when transmitting the second substrate SUB2 then transmits the liquid crystal layer LQ and is reflected on the pixel electrode PE to be directed to the second substrate SUB2. For example, the display panel PML does not shift the phase of the light L1 transmitting the liquid crystal layer LQ when in the OFF state, but shifts the phase of the light L1 transmitting the liquid crystal layer LQ when in the ON state. In the OFF state, the light L1 reflected by the pixel electrode PE is converted when transmitting the retardation film RT, into linearly polarized light polarized in the direction intersecting orthogonally with the transmission axis T of the polarizer PL, which does not transmit the polarizer PL. In the ON state, the light L1 reflected by the pixel electrodes PE is not polarized in the direction intersecting orthogonally with the transmission axis T of the polarizer PL while transmitting the retardation film RT, because the phase thereof has shifted in the liquid crystal layer LQ, and therefore it transmits the polarizer PL. In addition, the light L1 reflected by the pixel electrodes PE should preferably be scattered in order to expand the scattering range and to prevent rainbow colors. For example, a scattering layer may be provided in the optical device OD so as to scatter the light L1 reflected by the pixel electrodes PE. On the other hand, since the light L1 is scattered in the scattering portion 30S as illustrated, the optical device OD may not comprise a scattering layer. In addition, the structure of the optical device OD is not limited to that of the illustrated example, but may comprise some other layer having an optical function.

According to this embodiment, the display device comprises the reflective-type display panel PNL and the illuminating device 10 disposed on the display surface DA side of the display panel PNL. The illuminating device 10 comprises the optical modulator 30 and the light source 20 disposed on a side of the optical modulator 30 and emitting the light L1 into the optical modulator 30. The illuminating device 10 comprises the optical modulation layer 34 in the optical modulator 30, which exhibits scattering property or transmissivity depending on the voltage applied to the electrodes 32 and 36 and changes the brightness of the light emitted from the optical modulator 30 to the display panel PNL from one part to another. With this structure, the display device 1 can increase the contrast between a high brightness portion HB and its vicinity as compared to the case where the light of uniform luminance distribution enters the display panel PNL. Therefore, according to this embodiment, the display device 1 which can improve its display quality can be provided.

The illuminating device 10 comprises a plurality of light source blocks 25 and optical modulation cells 30-1 (subareas SB). The light source blocks 25 are arranged along the second direction Y. The optical modulation cells 30-1 are the regions corresponding to the partial electrodes 36A each extending along the second direction Y and arranged along the first direction X. When the light source blocks 25 provided in the light source 20 are driven all at a time, the illuminating device 10 controls the scattering property of the optical modulation cells 30-1, to enable one-dimensional local dimming, which adjusts the luminance distribution of the light L1 emitted from the photo-irradiation surface 30B. On the other hand, when the light source blocks 25 provided in the light source 20 are driven individually and independently, two-dimensional local dimming can be realized by controlling the light source blocks 25 and the optical modulation cells 30-1 which are arranged in intersecting directions. In other words, the illuminating device 10 is enabled to illuminate a high brightness portion HB at an even more pinpoint manner as compared to the one-dimensional local dimming, thereby improving the contrast of the display device 1. Moreover, all of the light source blocks 25 are not on at all times, but only those required for display are on and the others are off. Thus, the power consumption of the display device 1 can be reduced.

The optical modulation layer 34 comprises a first region (fine particles 34B) containing a liquid crystal material and a second region (bulk 34A) containing a polymeric material. In the OFF state, the optical axis AX2 of the first region is parallel to the optical axis AX1 of the second region. Here, since the elliptical bodies 134A and 134B of the first region and the second region have the same shape, the optical modulation layer 34 exhibits transparency in the OFF state and scattering property in the ON state. For example, when there is no sufficient outdoor daylight for the display device 1 to display images, the illuminating device 10 is turned on as an auxiliary. When the light of the illuminating device 10 is not required, the optical modulation layer 34 is maintained in the OFF state. When the light of the illuminating device 10 is required, voltage should be applied to the electrodes 32 and 36 to turn on into the ON state. Therefore the power consumption of the display device 1 can be reduced.

The upper electrode 36 of the optical modulator 30 comprises an optical absorption layer 36-2 and a reflective layer 36-1 provided on a side closer to the first transparent substrate 31 than the optical absorption layer 36-2. Since the optical absorption layer 36-2 can inhibit the reflection of outdoor daylight on the reflective layer 36-1, the display device 1 can suppress the deterioration in display quality, which may be caused by glare by reflection of outdoor daylight. Moreover, of the light scattering in the optical modulation layer 34, light directed in the direction opposite to the display panel PNL can be reflected by the reflective layer 36-1 to be redirected towards the display panel PNL, thereby making it possible to improve the use efficiency of the light L1 emitted from the light source 20. In other words, the display device 1 can reduce the power consumption.

In the OFF state, the optical axes AX1 and AX2 are parallel to the light incidence surface of the optical modulator 30, from which the light L1 from the light source 20 enters, and are set parallel to the photo-irradiation surface 30B by the alignment regulation force of the horizontal alignment films 33 and 35 arranged between the electrodes 32 and 36 and the optical modulation layer 34. The electrodes 32 and 36 are arranged to oppose each other via the optical modulation layer 34. Here, the liquid crystal material of the first region is positive type liquid crystal molecules, and therefore in the OFF state, the optical axis AX2 extends in the thickness direction of the optical modulation layer 34, which is perpendicular to the major surface thereof (XY plane). With regard to the scattering anisotropy of the optical modulation layer 34 in the ON state, the scattering of light in the thickness direction perpendicular to the major surface of the optical modulation layer 34 is greater than that in the direction parallel to the major surface of the optical modulation layer 34. Therefore, the lights L1 emitted from the light source 20 can be scattered efficiently in the scattering portion 30S towards the display panel PNL, thereby making it possible to reduce the power consumption of the display device 1.

The second region has a fibrous structure having a longitudinal axis along the second direction Y. Here, the light polarized in the direction parallel to the longitudinal axis of the fibrous structure is scattered in the scattering portion 30S. Therefore, when the light L1 emitted from the light source 20 is polarized in the second direction Y, the scattering intensity in the scattering portion 30S can be improved. Moreover, when the transmission axis T of the polarizer PL provided in the display panel PNL is parallel to the longitudinal axis of the fibrous structure, the loss of light in the polarizer PL can be reduced.

Next, modified examples of the structure of the electrodes 32 and 36 in this embodiment will be described. Note that with the modified examples, an advantageous effect similar to that of the above-described configuration example can be obtained.

Figure 13:
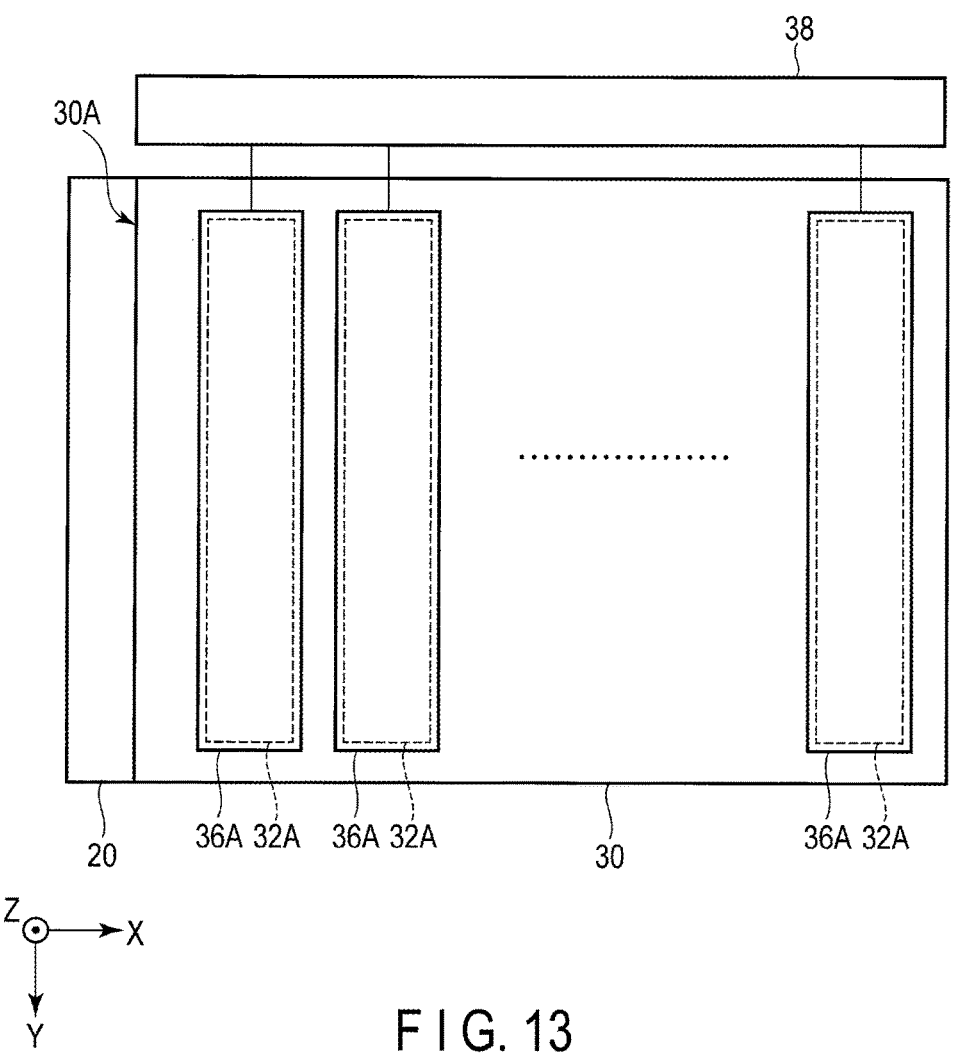
FIG. 13 is a diagram showing the first modified example of the configuration of the electrode.

FIG. 13 is a diagram showing the structure of an electrode according to the first modified example.

This modified example is different from the configuration example shown in FIG. 4 in that the lower electrode 32 includes a plurality of partial electrodes 32A.

The partial electrodes 32A oppose the partial electrodes 36A, respectively. The partial electrodes 32A each extended in the second direction Y, which is an extending direction of the light incidence surface 30A, and are arranged along the first direction X, which intersects orthogonally with the light incidence surface 30A. The partial electrodes 32A and 36A are connected to the drive circuit 38. The drive circuit 38 controls the voltage applied to the partial electrodes 32A and 36A. In the modified example, the transmissivity of the optical modulator 30 can be improved as compared to the case where the lower electrode 32 is a single sheet-like electrode formed over the entire surface, thereby making it possible to improve the display quality of the display device 1.

Figure 14:
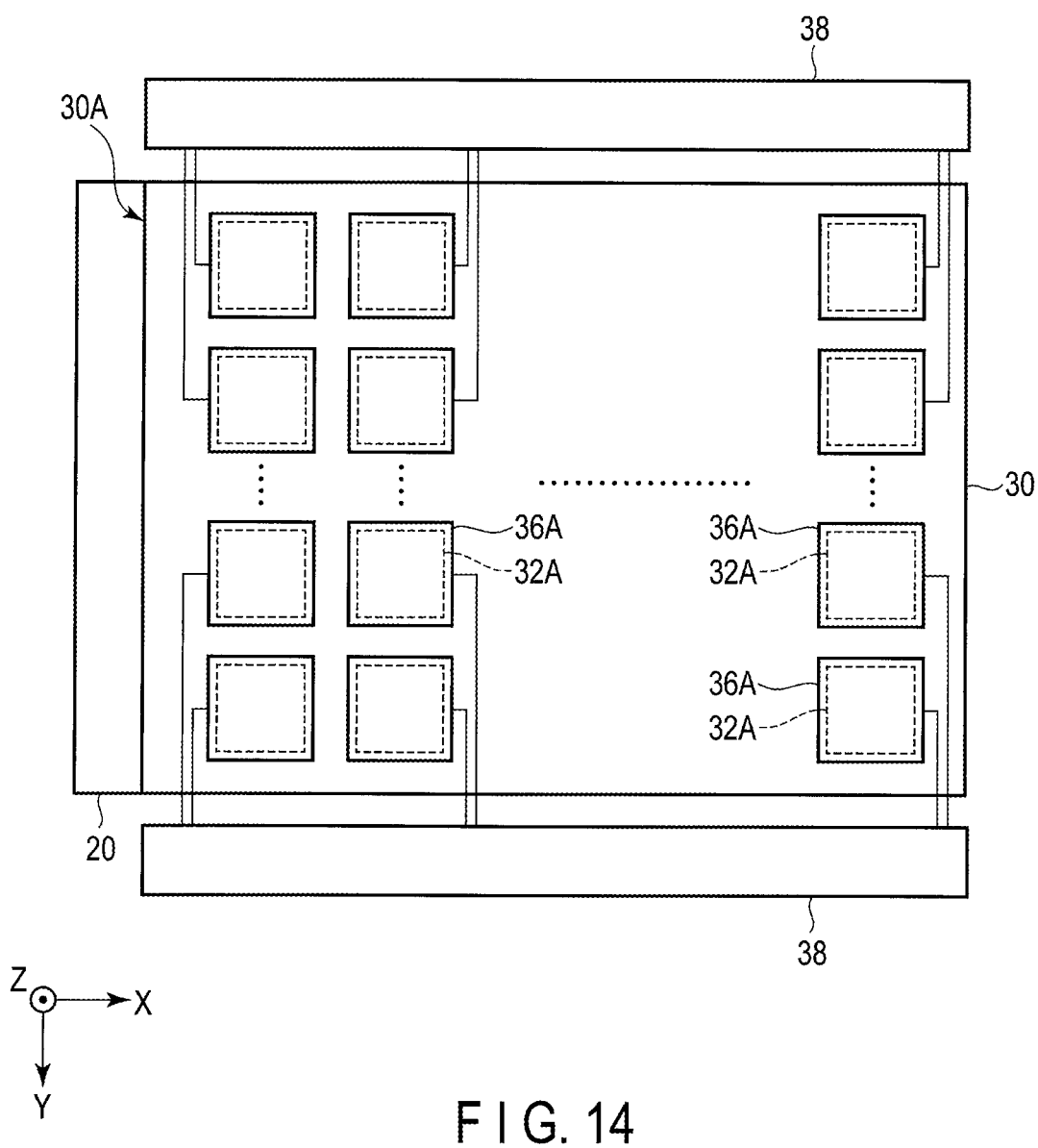
FIG. 14 is a diagram showing the second modified example of the configuration of the electrode.

FIG. 14 is a diagram showing the structure of an electrode according to the second modified example.

This modified example is different from that shown in FIG. 13 in that the partial electrodes 32A and 36A are discontinuously formed along the second direction Y.

The partial electrodes 32A and 36A are formed island-wise and respectively oppose each other. Further, the partial electrodes 32A and 36A are arranged in a matrix along the first direction X and the second direction Y. All of the partial electrodes 32A and 36A are connected to the drive circuit 38. In this modified example, even if the dot light emitters of the light source 20 are driven at a time, two-dimensional local dimming can be realized only by controlling the voltage applied to the partial electrodes 32A and 36A. Moreover, since voltage can be applied only to the partial electrodes 32A and 36A corresponding to the high brightness portion HB, which needs to be illuminated, the power consumption can be reduced. Furthermore, by reducing the ratio of the area of the electrodes 32 and 36 occupying in the major surface of the optical modulator 30, the transmissivity of the optical modulator 30 can be improved, thereby making it possible to enhance the display quality of the display device 1.

FIG. 15 is a diagram showing the structure of an electrode according to the third modified example.

This modified example is different from that shown in FIG. 13 in the arrangement direction of the partial electrodes 32A.

The partial electrodes 32A each extend along the first direction X and are arranged along the second direction Y. The partial electrodes 32A and the partial electrodes 36A, respectively, intersect each other. In this modified example, light can be scattered only at the intersections where the partial electrodes 32A and 36A oppose each other, to which voltage is applied. Therefore, even if the dot light emitters of the light source 20 are driven at a time, two-dimensional local dimming can be realized only by controlling the voltage applied to the partial electrodes 32A and 36A.

Next, modified examples of the structure of the upper electrode 36 in this embodiment will be described.

FIG. 16 is a diagram showing the structure of an upper electrode according to the first modified example.

This modified example is different from that shown in FIG. 5 in that the apertures AP are circular.

The apertures AP are formed in each partial electrode 36A. In the illustrated example, the apertures AP are the same as each other in number and size in each partial electrode 36A, and the partial electrodes 36A are equal to each other in the density of the apertures AP (the occupying ratio of the apertures AP in per unit area in the partial electrodes 36A). In this modified example as well, an advantageous effect similar to that of the above-described configuration example can be obtained.

FIG. 17 is a diagram showing the structure of an upper electrode according to the second modified example.

This modified example is different from that shown in FIG. 16 in the density of apertures AP in the first direction X.

The density of apertures AP is high (dense) in those of the partial electrodes 36A which are close to the light source 20, and is low (sparse) in those distant from the light source 20. In the illustrated example, the partial electrodes 36A are the same as each other in the number of apertures AP. The diameter of aperture AP becomes smaller as it is located further away from the light source 20. Note that the density of apertures AP may be controlled by the number thereof. That is, the number of apertures AP may be decreased as they are located further away from the light source 20. In the modified example as well, an advantageous effect similar to that shown in FIG. 16 can be obtained. Furthermore, in this modified example, an averaging in the luminance of light emitted from the optical modulator 30 can be achieved between the region close to the light source 20, which has a large amount of light and the region distant from the light source 20, which has a small amount of light. Therefore, the deterioration of the display quality, which may be caused by unevenness in brightness, can be suppressed.

Next, a modified example of the structure of the optical modulator 30 according to this embodiment will be described.

FIG. 18 is a diagram showing the structure of an optical modulator according to the modified example.

This modified example is different from that shown in FIG. 2 in that the optical modulation layer 34 includes a high transmittance portion 34C (third region).

The high transmittance portion 34C has light transmittance higher than that of the bulk 34A or the fine particles 34B and is formed of, for example, a resin material. The high transmitting portion 34C is provided between the bulk 34A and the fine particles 34B arranged in adjacent optical modulation cells 30-1, and is provided, for example, on a surface of the transparent substrate 37, which is on a side close to the transparent substrate 31. The high transmitting portion 34C may be formed, for example, integrally with the transparent substrate 37 as one unit. The high transmitting portion 34C is covered with the alignment film 35, and is in contact with the alignment film 33 via the alignment film 35. In the modified example, an advantageous effect similar to that of the above-described configuration example can be obtained. Furthermore, the transmissivity of the optical modulation layer 34 can be improved and therefore the display quality of the display device 1 can be enhanced.

As described above, according to this embodiment, a display device which can improve the display quality can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A device comprising:
    a first transparent substrate;
    a first electrode on the first transparent substrate;
    a second transparent substrate opposed to the first transparent substrate;
    a second electrode on the second transparent substrate;
    an optical modulation layer located between the first electrode and the second electrode; and
    a plurality of dot-like light emitters arranged along one side of both the first transparent substrate and the second transparent substrate,
    wherein the optical modulation layer includes liquid crystal molecules and a polymeric material, and
    a longitudinal axis of the liquid crystal molecules and a longitudinal axis of the polymeric material are parallel to a direction in which the dot-like light emitters are arranged when no voltage is applied between the first electrode and the second electrode.

2. The device of claim 1, wherein
    the liquid crystal molecules and the polymeric material have optical anisotropy and different response speeds to an electric field.

3. The device of claim 1, wherein
the longitudinal axis of the polymeric material is parallel to the one side.

4. The device of claim 1, further comprising:
a first horizontal alignment film located between the first electrode and the optical modulation layer; and
a second horizontal alignment film located between the second electrode and the optical modulation layer.

5. The device of claim 4, wherein
the optical modulation layer has anisotropic scattering property in which scattering in a thickness direction of the optical modulation layer, which is perpendicular to a major surface thereof, is greater than scattering in a direction parallel to the major surface of the optical modulation layer.

6. The device of claim 1, wherein
an ordinary light refractive index of the liquid crystal molecules and an ordinary light refractive index of the polymeric material are equal to each other, and
an extraordinary light refractive index of the liquid crystal molecules and an extraordinary light refractive index of the polymeric material are equal to each other.

7. The device of claim 1, wherein
the optical modulation layer further comprises a resin material having an optical transmittance higher than optical transmittances of the liquid crystal molecules and the polymeric material.

8. The device of claim 1, further comprising:
an optical absorption layer located between the second electrode and the second transparent substrate.

9. The device of claim 8, wherein
the optical absorption layer is in contact with the second electrode.

10. The device of claim 9, wherein
the second electrode comprises a reflective layer.

11. The device of claim 1, wherein
the second electrode comprises apertures directly on the first electrode.

12. The device of claim 1, wherein
the first electrode is a sheet-like electrode, and
the second electrode comprises a plurality of belt-like partial electrodes.

13. The device of claim 1, wherein
the first electrode comprises a plurality of first belt-like partial electrodes,
the second electrode comprises a plurality of second belt-like partial electrodes, and
the first belt-like partial electrodes overlap the second belt-like partial electrodes, respectively.

14. The device of claim 1, wherein
the first electrode comprises a plurality of first partial electrodes arranged in a matrix,
the second electrode comprises a plurality of second partial electrodes arranged in a matrix, and
the first partial electrodes overlap the second partial electrodes, respectively.

15. The device of claim 1, wherein
the first electrode comprises a plurality of first belt-like partial electrodes,
the second electrode comprises a plurality of second belt-like partial electrodes, and
the first belt-like partial electrodes and the second belt-like partial electrodes intersect each other.

16. The device of claim 1, wherein
the second electrode comprises a first partial electrode and a second partial electrode,
the first partial electrode is located between the dot-like light emitters and the second partial electrode,
the first electrode comprises a first aperture,
the second electrode comprises a second aperture, and
a diameter of the second aperture is smaller than a diameter of the first aperture.

* * * * *